US 9,526,065 B2

(12) United States Patent
Chhabra

(10) Patent No.: US 9,526,065 B2
(45) Date of Patent: Dec. 20, 2016

(54) DEVICE AND METHOD FOR WIFI SCAN OPTIMIZATION

(71) Applicant: APPLE INC., Cupertino, CA (US)

(72) Inventor: Kapil Chhabra, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 186 days.

(21) Appl. No.: 14/291,965

(22) Filed: May 30, 2014

(65) Prior Publication Data

US 2015/0351012 A1  Dec. 3, 2015

(51) Int. Cl.
*H04W 4/00* (2009.01)
*H04W 48/16* (2009.01)
*H04W 88/06* (2009.01)

(52) U.S. Cl.
CPC ............. *H04W 48/16* (2013.01); *H04W 88/06* (2013.01)

(58) Field of Classification Search
USPC ............................................... 455/434, 161.1
See application file for complete search history.

(56) References Cited

U.S. PATENT DOCUMENTS

| 8,598,984 | B2 | 12/2013 | Chhabra et al. | |
|---|---|---|---|---|
| 2009/0068970 | A1* | 3/2009 | Ahmed | H04W 48/16 455/161.1 |
| 2010/0091657 | A1* | 4/2010 | Tsfaty | H04W 52/0296 370/241 |
| 2011/0116453 | A1* | 5/2011 | Huang | H04W 48/18 370/329 |
| 2012/0026993 | A1* | 2/2012 | Radpour | H04W 4/021 370/338 |
| 2012/0148043 | A1* | 6/2012 | Tofighbakhsh | H04L 63/101 380/247 |
| 2013/0100944 | A1* | 4/2013 | Kwon | H04W 76/026 370/338 |
| 2015/0141005 | A1* | 5/2015 | Suryavanshi | H04L 67/125 455/434 |

\* cited by examiner

*Primary Examiner* — David Q Nguyen
(74) *Attorney, Agent, or Firm* — Fay Kaplun & Marcin, LLP

(57) ABSTRACT

A method and wireless station used to perform WiFi scans. The wireless station determines a first cell identity of a first cell to which the wireless station is currently connected, determines a second cell identity of a second cell that is available, determines whether either of the first or second cell identities are related to a WiFi network based on relationships between cell identities and WiFi networks stored in the wireless station, performs a first type of scan for available WiFi networks when either of the first cell identity or the second cell identity is related to the WiFi network and performs a second type of scan for available WiFi networks when neither of the first cell identity or the second cell identity is related to the WiFi network, the first type of scan is performed more frequently or over more channels compared to the second type of scan.

20 Claims, 5 Drawing Sheets

DEVICE AND METHOD FOR WIFI SCAN OPTIMIZATION

BACKGROUND INFORMATION

A station may establish a connection to a wireless communications network. The wireless communications network may include cellular networks, WiFi networks, etc. With WiFi networks, there may be credentials used for the station to establish a connection thereto. For example, a user name and/or a password may be required to be provided. To expedite subsequent connections to a WiFi network that the station has already connected, the station may store this credential information and associate the credential information with identifying information of the WiFi network such as a basic service set identifier (BSSID). Thus, subsequent attempts to connect to this WiFi network enable an automatic connection (requiring no user intervention) to be established when the station is within an operating area of the WiFi network. The station may store respective credential information for a plurality of WiFi networks. For example, the credential information for each WiFi network may be stored for those that are known (e.g., discovered with a prior connection thereto), is indicated as preferred (manually indicated or determined automatically), etc. Accordingly, the station may perform the automatic connection functionality for stored WiFi networks when within the respective operating area thereof.

DETAILED DESCRIPTION

Figure 1:
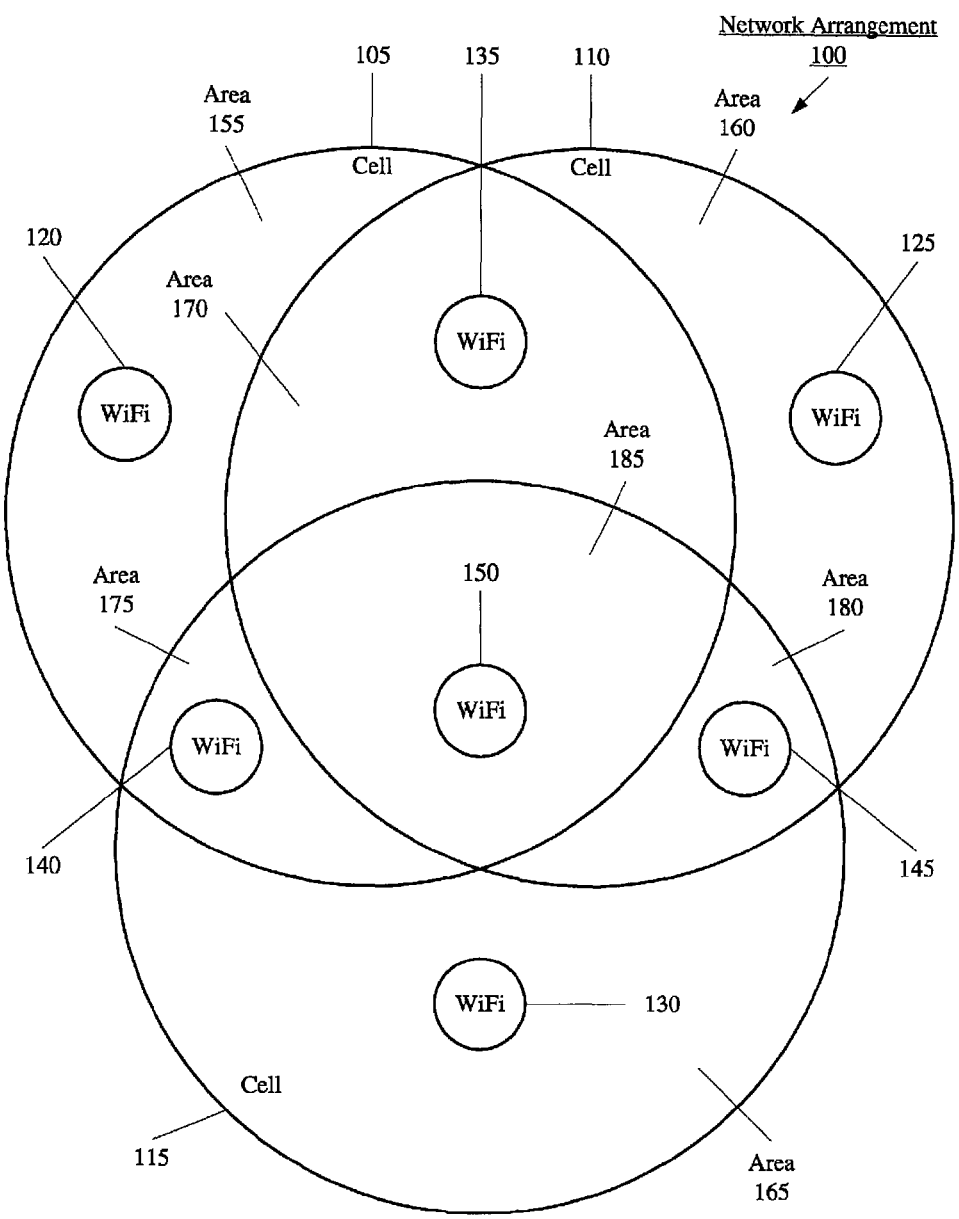
FIG. 1 shows an exemplary network arrangement in which a station monitors channels to establish a connection to a WiFi network.

The exemplary embodiments describe a method performed by a wireless station including determining a first cell identity of a first cell of a cellular network to which the wireless station is currently connected, determining a second cell identity of a second cell of the cellular network that the wireless station identifies as available to the wireless station, determining whether either of the first cell identity or the second cell identity is related to a WiFi network based on a comparison to relationships between cell identities and WiFi networks stored in the wireless station, performing a first type of scan for available WiFi networks when either of the first cell identity or the second cell identity is related to the WiFi network and performing a second type of scan for available WiFi networks when neither of the first cell identity or the second cell identity is related to the WiFi network, wherein the first type of scan is performed at least one of more frequently or over more channels compared to the second type of scan.

The exemplary embodiments further describe a station having a memory arrangement that stores identities of known WiFi networks and relationships between the known WiFi networks and cells of cellular networks, a cellular chip configured to identify cells of cellular networks that are available for communication with the station, and a WiFi chip configured to scan for WiFi networks that are available for communication with the station, wherein the WiFi chip performs a first type of scan for available WiFi networks when the cellular chip identifies available cells that have relationships with known WiFi networks and performs a second type of scan for available WiFi networks when the cellular chip identifies available cells that have no relationships with known WiFi networks, wherein the first type of scan is performed at least one of more frequently or over more channels compared to the second type of scan.

The exemplary embodiments also describe a method performed by a wireless station including determining if the wireless station is currently connected to a WiFi network, identifying all cells that are available to the wireless station when the wireless station is connected to the WiFi network and storing a reference that relates the WiFi network to all the cells that are available to the wireless station.

The exemplary embodiments also describe further methods performed by a wireless station. The first further exemplary method includes determining a cell identity of a cell of a cellular network to which the wireless station is currently connected, determining whether the cell identity is related to a WiFi network based on a comparison to relationships between cell identities and WiFi networks stored in the wireless station, performing a first type of scan for available WiFi networks when first cell identity is related to the WiFi network and performing a second type of scan for available WiFi networks when the cell identity is not related to the WiFi network, wherein the first type of scan is performed at least one of more frequently or over more channels compared to the second type of scan. The second further exemplary method includes determining a cell identity of a cell of a cellular network to which the wireless station is currently connected, determining whether the cell identity is related to a WiFi network based on a comparison to relationships between cell identities and WiFi networks stored in the wireless station, adjusting a parameter of a WiFi scan based on whether the cell identity is related to a WiFi network and performing the WiFi scan based on the parameter.

The exemplary embodiments may be further understood with reference to the following description and the related appended drawings, wherein like elements are provided with the same reference numerals. The exemplary embodiments are related to a station and method for optimizing scans that are performed to determine available WiFi networks. A coarse location estimate may be used to dynamically select a manner of scanning for available WiFi networks. In a first aspect, the station and method may initially generate a WiFi network database that includes each WiFi network known by the station and relation information that includes cell information, e.g., cell ID's of base stations in the area of each of the known WiFi networks. In a second aspect, the station and method may subsequently utilize the WiFi network database to dynamically select the manner of scanning for available WiFi networks. There may be multiple manners of scanning for WiFi networks that each have different characteristics, e.g., the time between scans, the frequencies that are scanned, etc. The cell relation information that includes cell identities may be used to select the scanning manner to identify any available WiFi networks.

A WiFi network may be a wireless communications network that enables a station to establish a connection thereto and allow the station to communicate with network components, other networks such as the Internet, and other stations within the WiFi network as well as in the other networks. Another generic name for this type of network may be a wireless local area network ("WLAN"). The WiFi network may be personal (e.g., a home network), for an enterprise (e.g., a business network), a HotSpot, etc. The WiFi network may also be defined by a variety of different specifications such as IEEE 802.11a/b/g/n/ac. Thus, the term "WiFi network" as used in this description may refer to any type of wireless network that has characteristics similar to the networks described above.

WiFi networks may provide a more efficient connection for communications to be transmitted with, for example, the Internet than other types of wireless networks. For example, a connection established with the WiFi network may provide a transmission speed in uplink and/or downlink that is greater than a transmission speed associated with other networks such as a cellular network including a 3G network, a 4G network, a Long Term Evolution (LTE) network, etc. However, it should be noted that those skilled in the art would understand that the comparison in transmission speeds is dependent upon a variety of factors such as available bandwidth, traffic, etc. There may also be other reasons such as the cost of transmitting and receiving data that make WiFi networks preferable over other types of wireless networks. In view of this generally more optimal performance for data transmissions, the WiFi network may be preferred over the cellular networks.

Each WiFi network may have a unique identifier, for example, an access point of the WiFi network may transmit a beacon that advertises a Basic Service Set Identification (BSSID) of the WiFi network that the access point supports. Thus, when the access point of the WiFi network broadcasts a beacon, this signal may include the BSSID of the WiFi network. When the station detects the beacon including the BSSID, the station may indicate the WiFi network as discovered in a list of available WiFi networks and display the list to the user so that the user may select a desired WiFi network to join. When a selected WiFi network is joined for the first time, the user of the station may be prompted to provide authentication information. For example, the WiFi network may include a security mechanism that requires a login and/or password to be provided for the station to establish a connection thereto. Upon providing the authentication information, the station may perform an association procedure to connect with the WiFi network.

The WiFi network may also be configured to require the authentication information to be provided each time the station attempts to join. In view of this request from the WiFi network, the station may be configured to provide an automatic connection to the WiFi network by storing the respective credential information and retrieving it when the credential request from the WiFi network is received. For example, the station may detect the beacon that includes the BSSID. The station may have a stored list of WiFi networks to which it has previously connected and the corresponding credential information for these known WiFi networks. Thus, when the station determines that an available WiFi network is a known WiFi network, the station may automatically provide the credential information during the association procedure to connect to the WiFi network without user intervention. The credential information and the associated BSSID may be stored, for example, in an relationship database. An example of an relationship database will be provided below. Therefore, a seamless manner relative to the user may be provided to automatically connect to known WiFi networks.

However, prior to the seamless manner being provided, the station is required to discover the WiFi network. A preliminary condition is that the station is within an operating area of the WiFi network such that the station detects the beacon. The station may be configured with a discovery mechanism that performs scans to discover the beacons of any available WiFi networks. These scans require power to be drawn from a power supply of the station such as a battery, which is a limited source. Thus, every scan for a WiFi network that is performed by the station reduces the battery life of the station.

FIG. 1 shows an exemplary network arrangement 100 in which a station monitors channels to establish a connection to a WiFi network. The network arrangement 100 may relate to a given area in which various wireless networks are available for connection by the station. It is noted that the station is not shown in FIG. 1, but it should be understood that the station may be located anywhere within the network arrangement 100. The network arrangement 100 may include a plurality of cells 105-115 and a plurality of WiFi networks 120-150. It should be noted that the use of cells and WiFi networks as well as the illustrated number of networks are only exemplary and the network arrangement 100 may include any number of cellular and WiFi networks as well as any type of wireless network. In the exemplary embodiments, it will be described that the WiFi scanning methods are determined based on relations between the cells 105-115 and the WiFi networks 120-150. However, those skilled in the art will understand that the functionalities described herein could be used to determine scanning methods for other types of networks (e.g., non WiFi networks) and that these scanning methods may be based on relations with other types networks (e.g., non-cellular relations).

It should also be noted that the term "cells" is used herein to describe a discrete network element that may be identified. For example, each cell 105-115 may refer to a coverage area of a base station (e.g., Node B, eNode B, etc.) within an individual carrier's network. Each of these base stations will have a unique identification (e.g., cell ID) that may be used to uniquely identify the particular cell. It may also be that the cells 105-115 include base stations from different carriers, e.g., the station may have a roaming function set such that it connects to base stations from multiple carriers.

The cells 105-115 and the WiFi networks 120-150 may be disposed within the network arrangement 100 in a variety of manners. As illustrated, the cellular network 105 may have an operating area that overlaps with an operating area of the cell 110 and an operating area of the cell 115 while the cell 110 may also have the operating area that overlaps with the operating area of the cell 115. Accordingly, the network arrangement 100 may include an area 155 in which only the cell 105 is available; an area 160 in which only the cell 110 is available; an area 165 in which only the cell 115 is available; an area 170 in which the operating areas of cells 105 and 110 overlap such that cells 105 and 110 are available; an area 175 in which the operating areas of cells 105 and 115 overlap such that the cells 105 and 115 are available; an area 180 in which the operating areas of the cells 110 and 115 overlap such that the cells 110 and 115 are available; and an area 185 in which the operating areas of cells 105-115 overlap such that cells 105-115 are all available. The WiFi networks 120-150 may each have a respective operating area that is within one or more of the operating areas of the cells 105-115. As illustrated, the WiFi network 120 may be in the area 155 in which only the cell 105 only is also available; the WiFi network 125 may be in the area 160 in which only the cell 110 is available; the WiFi network 130 may be in the area 165 in which only the cell 115 is available; the WiFi network 135 may be in the area 170 in which the cells 105 and 110 are available; the WiFi network 140 may be in the area 175 in which the cells 105 and 115 are available; the WiFi network 145 may be in the area 180 in which the cells 110 and 115 are available; and the WiFi network 150 may be in the area 185 in which the cells 105-115 are available.

It should be noted that the manner in which the cells 105-115 overlap as illustrated in the network arrangement 100 and the manner in which the WiFi networks 120-150 are disposed in the network arrangement 100 are only exemplary. Those skilled in the art will understand that the cells 105-115 may overlap in different arrangements, may not overlap with each other, may only have two operating areas that overlap, etc. Those skilled in the art will also understand that the WiFi networks 120-150 may be disposed in different areas, have more than one WiFi network within a common area, have no WiFi network within a particular area, have a WiFi network at a border of an area, etc. It should also be noted that the shapes of the operating areas of the cells 105-115 and the WiFi networks 120-150 are for illustrative purposes only. Those skilled in the art will understand that the operating areas may be of any shape, for example, when structures impede signal transmission. It should further be noted that the sizes of the cells 105-115 and the WiFi networks 120-150 are only exemplary. For example, the sizes of each of the operating areas of the cells 105-115 and/or the WiFi networks may be different. In another example, the size of the operating areas of the WiFi networks 120-150 are not required to be smaller than the operating areas of the cells 105-115.

Figure 2:
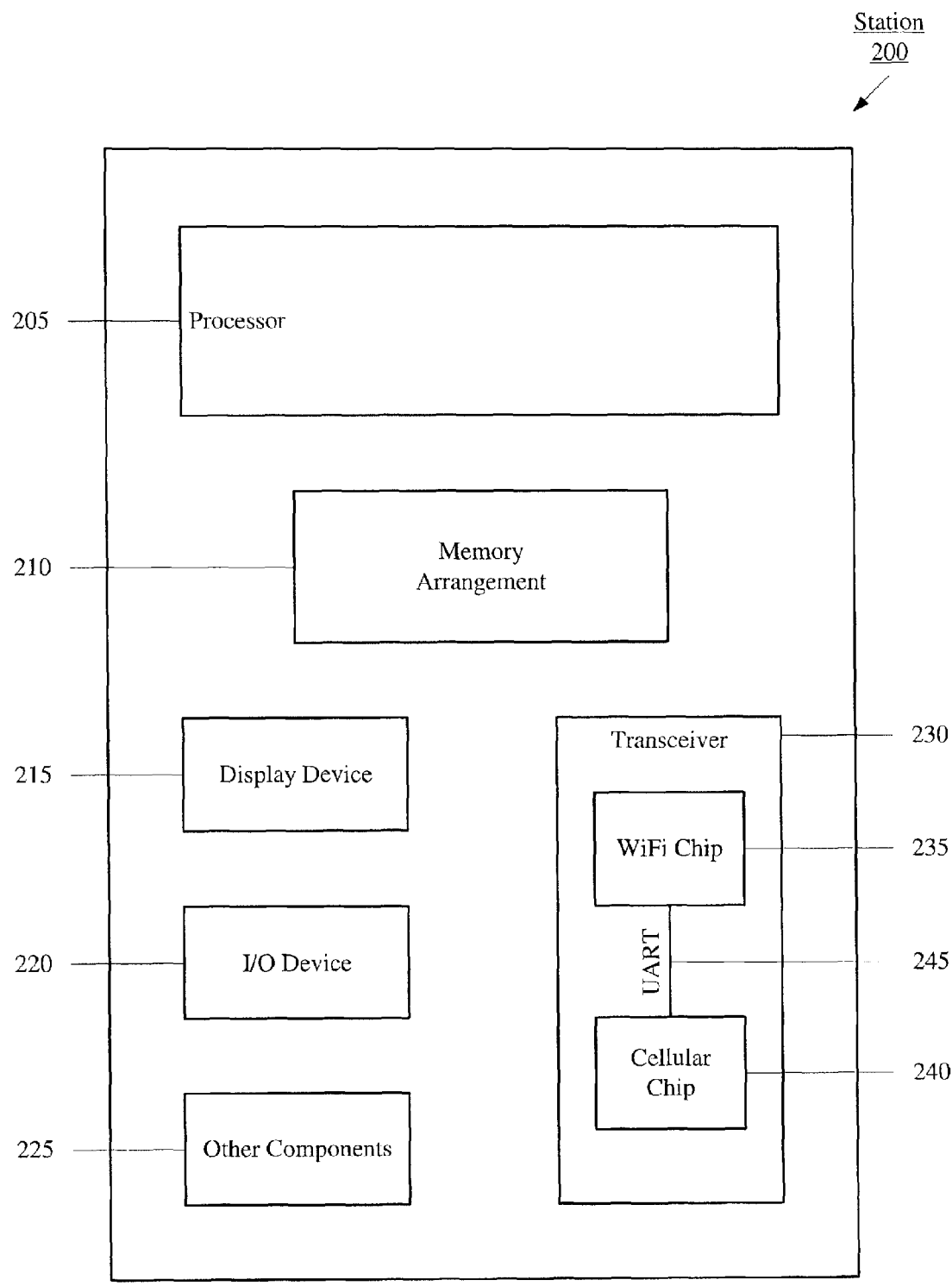
FIG. 2 shows components of an exemplary station configured to monitor WiFi channels to establish a connection to a WiFi network.

Within the network arrangement 100, the station may be disposed in any of the areas 155-185. That is, the station may be capable of connecting to one of the WiFi networks 120-150 and also capable of detecting the cells that are available in the given area. FIG. 2 shows components of an exemplary station 200 that is disposed in the network arrangement 100 and configured to monitor WiFi channels to establish a connection to one of the WiFi networks 120-150. Specifically, the station 200 may perform a dynamic scanning manner based upon detected cells in the given area. The station 200 may represent any electronic device configured to join the WiFi networks 120-150 and detect the cells 105-115. For example, the station 200 may be a portable device such as a cellular phone, a smartphone, a tablet, a phablet, a laptop, etc. The station 200 may include a processor 205, a memory arrangement 210, a display device 215, an input/output (I/O) device 220, other components 230 such as a portable power supply, an audio I/O device, etc., and a transceiver 230 that includes a WiFi chip 235 and a cellular chip 240 connected to each other using a Universal Asynchronous Receiver/Transmitter (UART) 245.

As will be described in greater detail below, the WiFi chip 235 may be configured to perform the scanning method to detect the beacons from any available WiFi networks. The exemplary embodiments allow the WiFi chip 235 to dynamically alter the type of scanning that is performed. Several examples of different scanning types will be described below. The type of scanning selected will be based on the cell relation information that corresponds to a coarse location of the station. It should be noted that the use of the WiFi chip 235 to determine the type of scanning that is used is only exemplary and other components of the station may participate with the WiFi chip 235 in the determination or may perform the entirety of the determination of the type of scanning.

The memory arrangement 210 may be a hardware component configured to store data related to operations performed by the station 200. For example, the memory arrangement 200 may store the relationship database that is used by the WiFi chip 235 that includes the cellular information relations with the WiFi networks. The display device 215 may be a hardware component configured to show data to a user while I/O device 220 may be a hardware component configured to receive inputs from the user and output corresponding data such as a hostname request. For example, when one of the WiFi networks 120-150 is first joined and credential information is required, a prompt for the request of the credential information may be shown on the display device 215 and the user may provide the credential information via the I/O device 220. The other components 225 may include a portable power supply (e.g., battery), a data acquisition device, ports to electrically connect the remote station 140 to other electronic devices, etc.

The transceiver 230 may enable the station 200 to communicate with the cells 105-115 and the WiFi networks 120-150. Specifically, the transceiver 230 may include the WiFi chip 235 for communications with the WiFi networks 120-150 and the cellular chip 240 for communications with the cells 120-150. Those skilled in the art will understand that the WiFi chip 235 and the cellular chip 240 may operate at frequencies in which the WiFi networks 120-150 and the cells 105-115 operate, respectively, for signals to be propagated. The UART 245 may be a connection component (e.g., an integrated circuit) that translates data between the WiFi chip 235 and the cellular chip 240. As will be described in further below, the use of the UART 245 may provide an exemplary embodiment in which the WiFi chip 235 may be awakened by the cellular chip 240 upon discovery of at least one of the cells 105-115. It should be noted that the use of the UART for communication between the cellular chip 240 and WiFi chip 235 is only exemplary and other manners of communicating data or information between the chips may be used.

Figure 3:
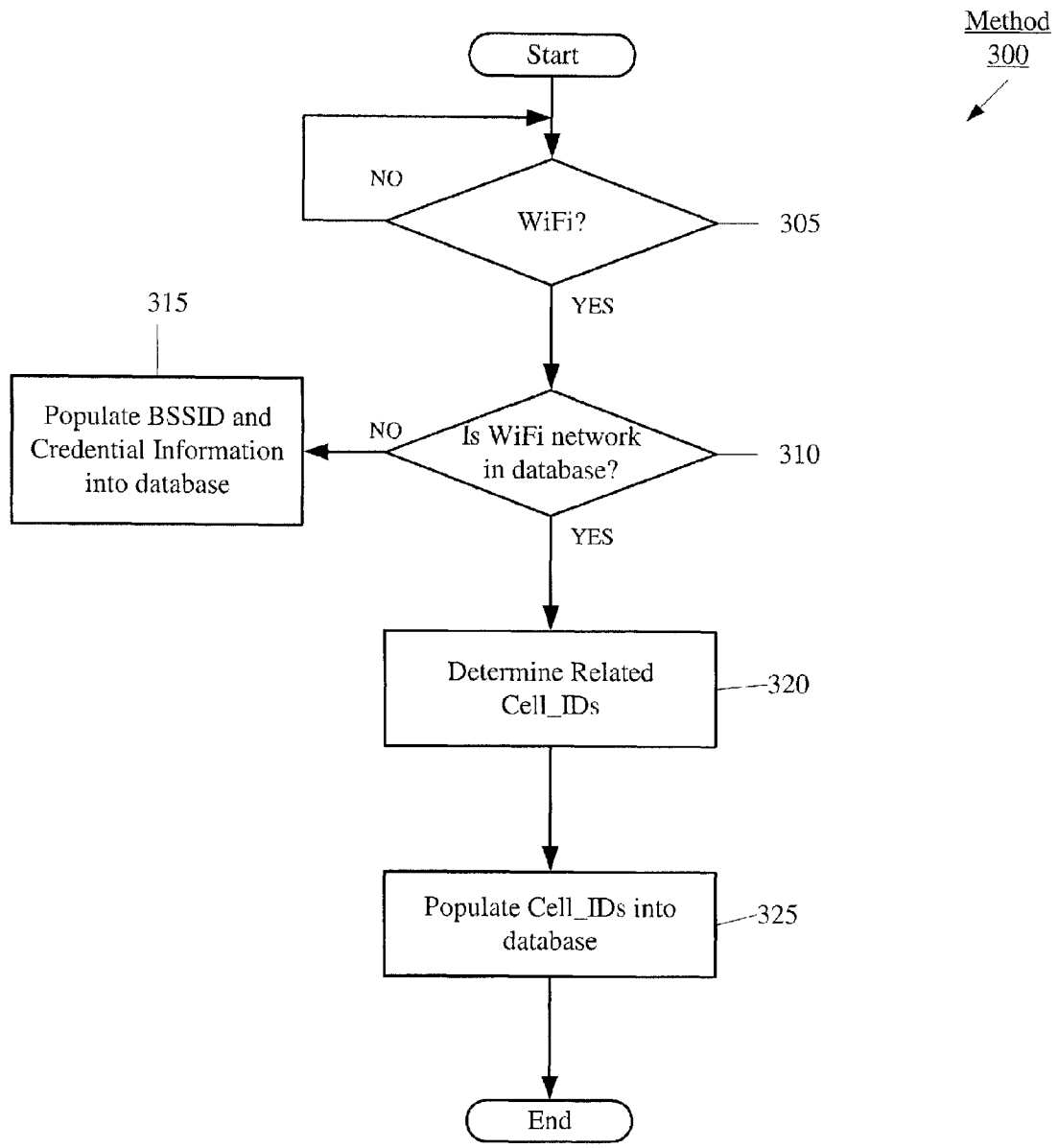
FIG. 3 shows an exemplary method for generating an relationship database that relates cellular information with WiFi information to be used in monitoring WiFi channels.

In a first aspect of the exemplary embodiments, the station 200 may generate the relationship database. FIG. 3 shows an exemplary method 300 for generating the relationship database. The method 300 will be described with reference to the network arrangement 100 of FIG. 1, the station 200 of FIG. 2 and the exemplary relationship databases represented in FIGS. 4 and 5.

In step 305, the station 200 determines whether it is currently connected to a WiFi network. If the station 200 is not currently connected to a WiFi network, the method 300 loops until the station is connected to a WiFi network. If the station 200 is connected to a WiFi network, the station 200 then determines, in step 310, whether the currently connected WiFi network is in the relationship database. As described above, each WiFi network will have a unique identification (e.g., BSSID) and the station 200 will know the identification of the network to which it is connected. Thus, the station 200 may compare the BSSID of the currently connected WiFi network to the BSSIDs that are stored in the relationship database.

Figure 4:
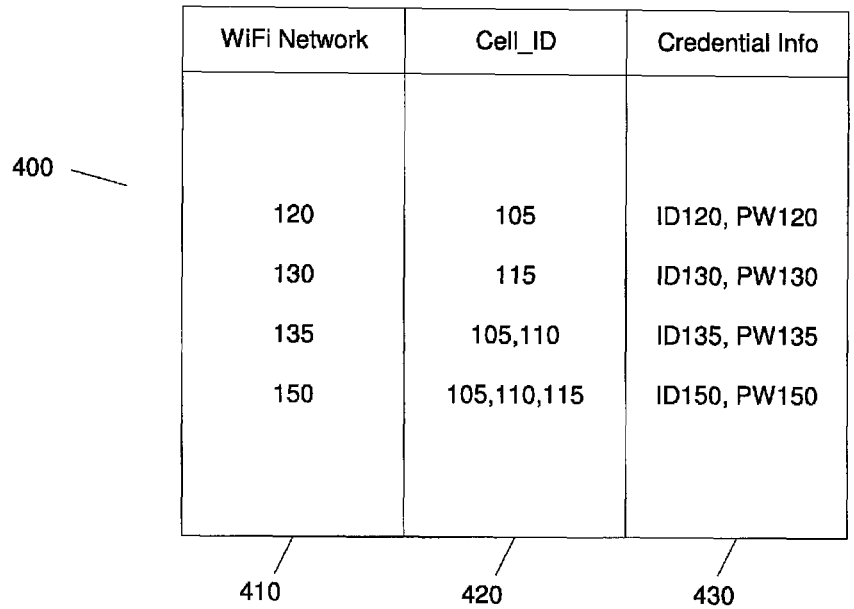
FIG. 4 shows an exemplary table that is representative of an relationship database with respect to the exemplary network arrangement of FIG. 1.

FIG. 4 shows a first exemplary table 400 that is representative of an relationship database with respect to the network arrangement 100. It should be noted that the table 400 is not fully populated for all the WiFi networks shown in the network arrangement 100. The table 400 includes an identification of the WiFi network 410 (e.g., BSSID), any related cells 420 (e.g., Cell IDs) and any credential information 430 for the station to access the WiFi network (e.g., User ID and password). In this example, the BSSIDs of the WiFi networks 120, 130, 135 and 150 are stored in the relationship database. Thus, in step 310, if the station 200 is connected to one of these WiFi networks, the method will continue to step 320.

However, if the station 200 is connected to one of the WiFi networks 125, 140, 145 that are not currently in the relationship database 400, the station 200, in step 315, will add the BSSID (column 410) and the credential information (column 430) to the relationship database 400. It should be noted that the station 200 may offer the user a choice as to whether to store the BSSID and credential information in the relationship database 400. For example, the user may decide that it is highly unlikely that the user will ever join this WiFi network again and elect not to store the information for the WiFi network. On the other hand, the WiFi network information may be stored automatically without user interaction. The station 200 may resolve the issue of infrequently or never reused WiFi networks by periodically purging the relationship database 400 based on connection dates/times. For example, the relationship database 400 may include a further field in which it is recorded each time the station 200 connects to (or disconnects from) the WiFi network. The record for a WiFi network may be purged if this field becomes older than some predetermined time period (e.g., a week, a month, a quarter, etc.). At the completion of step 315, the method continues to step 320. Thus, whether the WiFi network was newly populated or previously populated into the relationship database, the method continues to step 320.

In step 320, station 200 determines the related cells (e.g., cell IDs) that should be populated into the column 420 of the relationship database for the WiFi network. In one exemplary embodiment, when the station 200 is connected to the WiFi network, the WiFi chip 235 retrieves the cell ID from the cellular chip 240 to store in the relationship database 500. It should be noted that the cell ID may be from the cell that the station 200 is currently camped or may also be any other cell that the cellular chip 240 is currently receiving (e.g., the cellular chip is receiving a signal from the cell ID, even if it is not camped on that cell ID).

Referring to FIG. 1, it may be that station 200 is currently in location area 155 and connected to WiFi network 120. When in area 155, the station 200 is camped on (or is receiving signals) from cell 105. The WiFi chip 235 will retrieve this information from the cellular chip 240, i.e., that the station is receiving signals from cell 105, and in step 325, will store this information in the relationship database 400 as shown in column 420 for the entry of the WiFi network 120. As shown in the entries for WiFi networks 135 and 150, there may be multiple cells related with a WiFi network and the identities of each of these cells are stored in the relationship database 400. It is also noted that the steps 320 and 325 are performed even for the WiFi networks that have their entries previously populated because the relations may change over time. At the completion of the method 300, the relationship database 400 will be updated and complete with respect to the WiFi network with which the station 200 is currently connected.

Figure 5:
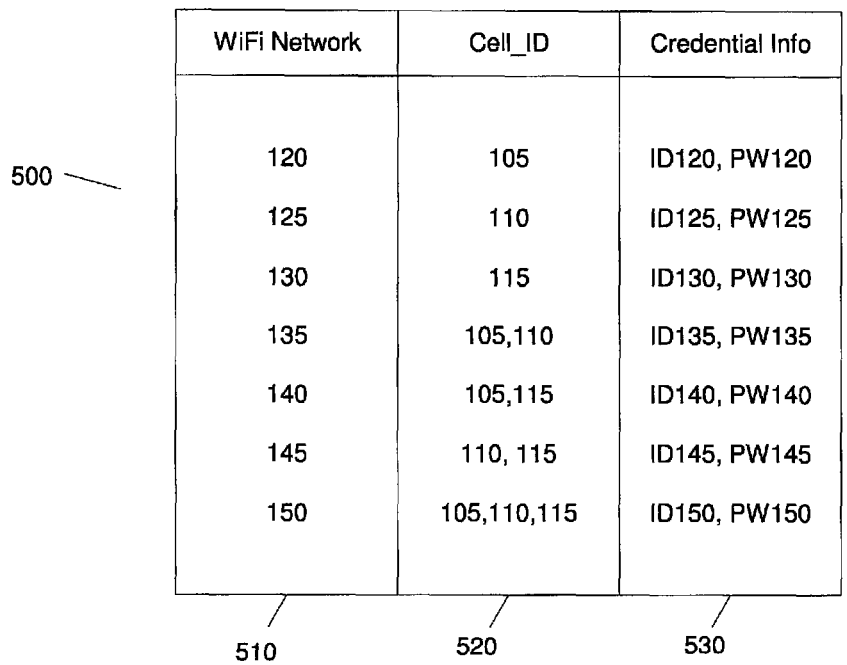
FIG. 5 shows a second exemplary table that is representative of a fully populated relationship database with respect to the exemplary network arrangement of FIG. 1.

FIG. 5 shows a second exemplary table 500 that is representative of an relationship database with respect to the network arrangement 100. The table shows the relationship database 500 if it were fully populated for the network arrangement 100. As described above, the relationship database may not be fully populated at all times (or ever) and the station 200 may perform the method 300 to continuously populate and update the relationship database.

In the examples of FIGS. 4 and 5, the relationship database may indicate that the WiFi network 120 is only related with the cell 105 and has related credential information ID1 and PW1. In another example, the WiFi network 135 is related with the cell 105 and the cell 110. In a further example, the WiFi network 150 is related with all the cells 105-115. This relation information for the WiFi networks 120-150 may be used as the basis for determining the coarse location estimate as will be described in greater detail below.

It should be noted that the station 200 generating the relationship database is only exemplary. In another example, a populated relationship database may be received periodically from a remote source. In a further example, a proprietary network component that is properly accessed (via the Internet from a connection to one of the cells 105-115 or the WiFi networks 120-150) may provide WiFi network location and/or cell location information. The locations may be mapped to tag each WiFi network identity (e.g., BSSID) with corresponding cell identities such that the station 200 may populate the relationship database using the information from the proprietary network component. In yet another example, the relationship database may be generated based upon a combination of the station 200 generating some portion of the entries as well as from the information from the remote source.

When the station 200 solely generates the relationship database, the relationship database will only include those WiFi networks to which the station 200 has previously connected. When the relationship database is received from a remote source, it is possible that the relationship database may include WiFi networks to which the station 200 has never connected. The remote source may send the relationship database or an update to the relationship database based on a number of factors. For example, when the station 200 is taken to a new geographic location, the remote source may send relation information for all known public WiFi networks in the geographic locations because it may be likely that the station will connect to these public WiFi networks.

It should further be noted that the use of the identities of only the cells 105-115 is only exemplary. Those skilled in the art will understand that identity information of other types of networks that are available and discovered may also be used to further optimize the manner in which the scan is to be performed. In a first example, the types of cells may be used as a more defined manner of identifying the area. In a second example, a non-cellular network identity may be used in conjunction with cell identities. In a third example, other WiFi network identities may be used in conjunction with other discovered network identities. Specifically, it is not uncommon for an enterprise WiFi network to be available in a building. The building may include other enterprise WiFi networks. Thus, the discovered WiFi networks and the discovered cells may be used in conjunction with each other to determine the scanning manner to be used.

Using the above-described method, the relationship database may be generated for use by the WiFi chip 235 to perform a subsequent scan. In the examples described herein, two types of scans will be described. The first type of scan may be a frequent and/or comprehensive frequency scan. For example, the scanning may be comprehensive in that it is performed over all the supported channels (e.g., 35 channels) in the 2.4 GHz range and the 5 GHz range corresponding to WiFi networks. The scanning may be frequent in that it is performed every 45 seconds. However, it should be noted that the exact time period in which the scanning is performed is not important. Generally, the time period for the first type of scan is more frequent than the second type of scan. This first type of scan may be performed when it is likely that a known WiFi network will be found. For example, as the user is approaching their home WiFi network, this first type of more frequent scan may be utilized so that when the station is within the range of the home WiFi, the station will be automatically connected to the home WiFi.

The second type of scan may be an occasional and/or selected frequency scan. Specifically, the scanning may be selected in that it is performed only over selected channels (e.g., channels 1, 6, and 11) in the 2.4 Ghz and/or 5 GHz range corresponding to WiFi networks. The scanning may be occasional in that it is performed less often than the first type of scan. For example, as described above, the first type of scan may be performed every 45 seconds but the second type of scan may use a period of 135 seconds. That is, the time period of the second type of scan is greater than the time period used in the first type of scan. This type of scan may be performed when it is less likely that a known WiFi network will be found. For example, the user of the station may be in transit between work and home in a location that is near neither of these locations that include a known WiFi network. The cell on which the station is currently camped may not have any related known WiFi networks and therefore it is unlikely that a known WiFi network will be found and the second, less frequent, type of scan may be used.

Figure 6:
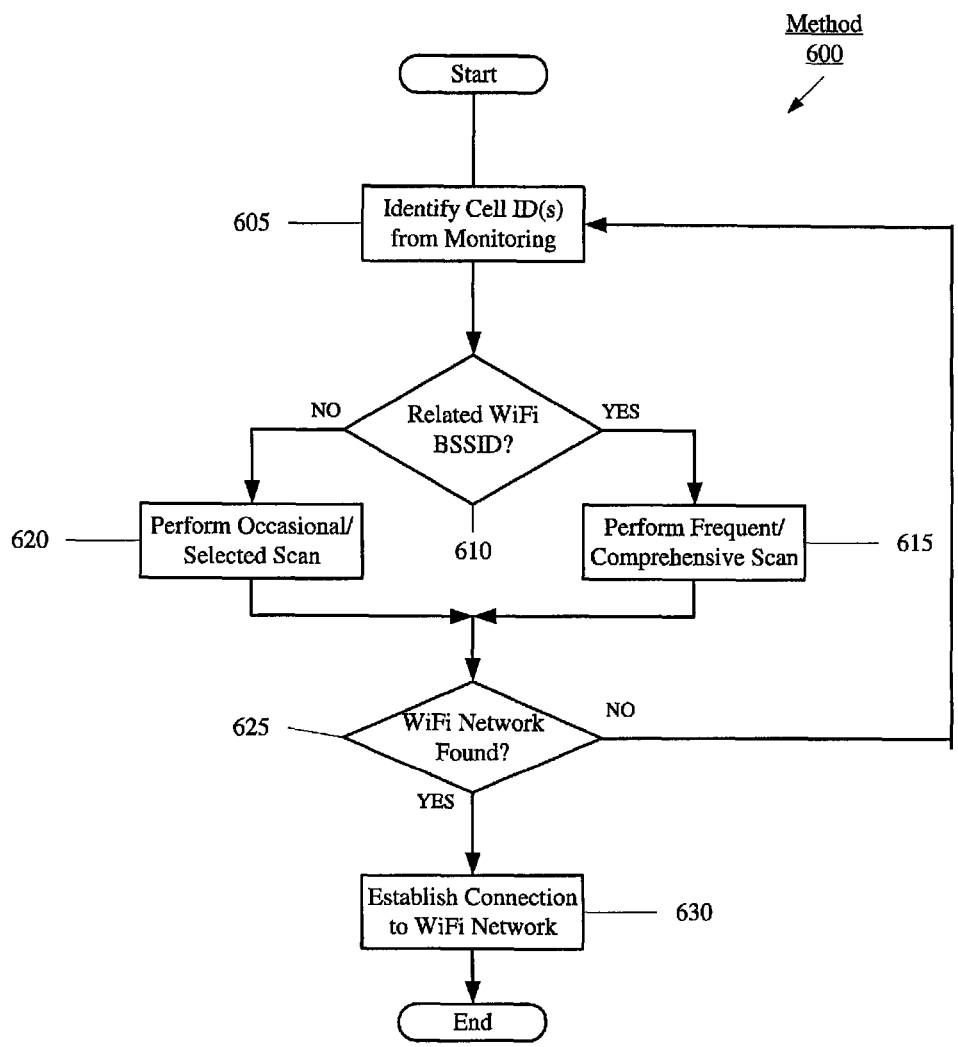
FIG. 6 shows an exemplary method for monitoring WiFi channels based upon cellular information being related with WiFi information.

FIG. 6 shows an exemplary method 600 for determining the type of scan for WiFi networks that will be performed by the station 200. The method 600 will be described with reference to the network arrangement 100 of FIG. 1, the station 200 of FIG. 2 and the relationship database 500 of FIG. 5. Thus, it will be assumed for the purposes of describing method 600 that the relationship database is fully populated for the network arrangement 100. However, it should be understood that it is not necessary for the relationship database to be fully populated in order for method 600 to be performed.

The station 200 and its components perform the method 600. It will generally be described that the WiFi chip 235 and the cellular chip 240 are performing the described steps. However, other components of the station 200 may be involved in performing the steps, such as the processor 205 and the memory arrangement 210.

In step 605, the station 200 identifies the available cells. For example, the station 200 may be located in area 170. In this case, the station 200, specifically, cellular chip 240, will identify cells 105 and 110 as available to the station. The cell monitoring functionality to determine identities of available cells may be a process that is passively monitored based upon the platform, software/hardware implementation, etc. Thus, the exemplary embodiments may not require any additional overhead in terms of power consumption for this functionality because the cellular chip 240, in its normal operation, may be performing this monitoring. As described above, the cells that are identified are not limited to only the cell on which the station 200 is currently camped, but may include any cell with which the station 200 may currently communicate, regardless of whether the station 200 has selected to communicate with a particular cell.

In step 610, the station 200 may determine if any entry in the relationship database includes the identified cells. In this example, the identified cells are cells 105 and 110. This determination may be made in different manners. In a first example, the cellular chip 240 may identify the cells and compare the identified cells with the relationship database 500 that may be stored in the memory arrangement 210. If there is a match, the cellular chip 240 may inform the WiFi chip 235 that the station has entered a cell of interest, e.g., a cell that has at least one related WiFi network according to the relationship database 500. The cellular chip 240 may inform the WiFi chip 235 via the UART 245. When the WiFi chip 235 receives the indication of the cell of interest, the WiFi chip may be awakened and perform the scan in accordance with process described below.

In another example, the WiFi chip 235 may actively monitor the cells identified by the cellular chip 240. In this example, the WiFi chip 235 will compare the identified cells to the relationship database 500 to determine if there are any WiFi networks related to the identified cell(s). Thus, the result of step 610 will either be that an identified cell has an related WiFi network or there is no WiFi network related to the identified cell.

Continuing with the above example of the station 200 being located in area 170 with identified cells 105 and 110, the comparison of these cell IDs to the relationship database 500 indicates that there are six (6) related WiFi networks. Specifically, WiFi network 120 (cell 105), WiFi network 125 (cell 110), WiFi network 135 (cells 105 and 110), WiFi network 140 (cell 105), WiFi network 145 (cell 110) and WiFi network 150 (cells 105 and 110).

Thus, the result of the step 610 in this example is the positive identification of an related WiFi network with the identified cells. The method will then proceed to step 615 where the WiFi chip will perform the first type of scan. As described above, the first type of scan is a more frequent, more comprehensive type of scan. This first type of scan is performed because it is more likely that a known WiFi network will be found in the current location of the station 200. Specifically, the coarse location that is identified by the cell coverage indicates that a known WiFi network is in the area of this coarse location determination. Thus, the station 200 will scan more frequently for WiFi networks because there is a higher likelihood of finding a known WiFi network.

On the other hand, if there is no related WiFi network with the identified cells in step 610, the method 600 will proceed to step 620 where the second type of scan will be performed. As described above, the second type of scan is a less frequent, less comprehensive scan as compared to the first type of scan. This second type of scan is performed because it is less likely that a known WiFi network will be found in the current location of the station 200. Specifically, the coarse location that is identified by the cell coverage indicates that there are no known WiFi networks in the area of this coarse location determination. Thus, the station 200 will scan less frequently and less comprehensively because this will save battery power over the first type of scan when there is a lower likelihood of finding a known WiFi network.

The WiFi chip 235 may have a default setting of the second type of scan, i.e., the less frequent, less comprehensive type of scan. That is, the default mode of operation may be that the WiFi chip will awake to perform the second type of scan based on the period of the second type of scan. Once the station enters into a cell of interest, the WiFi chip 235 may change to a mode where the first type of scan is performed, i.e., the more frequent, more comprehensive type of scan.

After the type of scan has been selected, the method proceeds to step 625 where it is determined whether a WiFi network has been found. More specifically, the selected scan type (at the set period) may be performed for the entire time the station 200 is in the identified cell or until a WiFi network has been detected by the scan. If no WiFi network has been detected the method 600 proceeds back to step 605 to determine the identified cells.

If a WiFi network has been found, the station 200, will attempt to automatically connect to the found WiFi network in step 630. As described above, it is more likely that a known WiFi network will be found when the first type of scan is being performed because the station 200 is in a location associated with a known WiFi network. However, it is possible that a known WiFi network may be found when performing the second type of scan. When the WiFi chip 235 identifies a known network in step 625, the WiFi chip 235 may wake the processor 205 to connect to an access point of the WiFi network. As described above, this connection may be an automatic connection because the relationship database will include the credential information for the known WiFi network and the station 200 may provide this credential information without any action required by the user.

To complete the example started above, the station 200 identified six known WiFi networks in step 610. Thus, in this example, the method will proceed to step 615 where the station 200 will perform the first type of scan. It may be assumed that that station 200 found at least one of the known WiFi networks that are associated with the coarse location of cells 105 and 110. Since in the example, the station 200 was located in area 170, it is likely that the scan will detect WiFi network 135 and possibly other WiFi networks. If WiFi network 135 is the only WiFi network that is detected, the station 200 will attempt to connect to the WiFi network 135. The detection of WiFi network 135 includes the detection of the beacon from WiFi network 135 that includes the BSSID. The station 200 may refer to the relationship database 500 that includes an entry for the WiFi network 135. The station 200 may then use the stored credential information for this WiFi network 135 to attempt an automatic connection.

It should be noted that the station 200 may detect more than one known WiFi network during the scans. In the example above, there were six (6) possible networks that were related to the cells that were identified. Thus, in the example, there is a possibility that the scans may detect multiple WiFi networks. The station 200 may be configured to automatically select one of these known WiFi networks, for example, based upon previous connection information. Thus, if a particular discovered, known WiFi network is selected more often than another discovered, known WiFi network, the station 200 may use this information for a corresponding action to be performed. In another example, the station 200 may select the WiFi network that has the best operating characteristics (e.g., highest RSSI, etc.).

It should also be noted that the method 600 for selecting the type of scan that will be performed is typically associated with a time period when the station 200 is not currently connected to a WiFi network. That is, when the station 200 is connected to a WiFi network, there is little reason to scan and automatically connect to another WiFi network. This does not mean that the method 600 cannot be performed when the station 200 is connected to a WiFi network. For example, there could be a situation where the station determines that the operating characteristics of a connected WiFi network are deteriorating (e.g., RSSI goes below a threshold, throughput goes below a threshold, etc.). When the station 200 detects these deteriorating characteristics, the station 200 may initiate the method 200 to detect and automatically connect to a different WiFi network before disconnecting from the current WiFi network.

The above exemplary embodiments provide a station and method for determining a scanning manner to be used in discovering WiFi networks based upon a coarse location estimate which is determined as a function of relation information with cells. The relation information may be determined prior to determining the scanning manner and stored in a database. When one or more identities of cells are found from a monitoring functionality, a WiFi network that has relation-information including these discovered cells may be determined. If such an relation exists, a relatively more aggressive and/or comprehensive scanning manner may be used to discover available WiFi networks whereas if no such WiFi network exists, a relatively more infrequent and/or selected scanning manner may be used. The exemplary embodiments result in dynamically increasing the frequency of WiFi scans when the user is, for example, arriving home or at the office where a known WiFi network may exist. The identity of the related cells that serve the home or office may provide the basis for the coarse location estimate. On the other hand, the exemplary embodiments reduce the frequency of scans when the user leaves the home or office and connects to a cellular network that is not included in the relation information of the known WiFi networks. Accordingly, power may be used to perform a WiFi scan that is more likely to result in discovering a known WiFi network in which an automatic connection may be performed. Less power may also be used to perform a WiFi scan that is less likely to result in discovering a known WiFi network.

Those skilled in the art will understand that the above-described exemplary embodiments may be implemented in any suitable software or hardware configuration or combination thereof. An exemplary hardware and software platform for implementing the exemplary embodiments may include, for example, a hardware device that operates the iOS operating system, a hardware device that operates the Android operating system, a hardware device that operates a Windows operating system etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method comprising:
   at a wireless station:
   determining a first cell identity of a first cell of a cellular network to which the wireless station is currently connected;
   determining a second cell identity of a second cell of the cellular network that the wireless station identifies as available to the wireless station;
   determining whether either of the first cell identity or the second cell identity is related to a WiFi network based on a comparison to relationships between cell identities and WiFi networks stored in the wireless station;

performing a first type of scan for available WiFi networks when either of the first cell identity or the second cell identity is related to the WiFi network; and performing a second type of scan for available WiFi networks when neither of the first cell identity or the second cell identity is related to the WiFi network, wherein the first type of scan is performed at least one of more frequently or over more channels compared to the second type of scan;

detecting an available WiFi network when performing one of the first and second scans;

automatically connecting to the detected available WiFi network, wherein a processor of the wireless station is in a sleep state and when the available WiFi network is detected, the processor is placed in an awake state to perform a portion of the automatically connecting.

2. The method of claim 1, wherein the automatically connecting includes providing credential information for the available WiFi network that is stored in the wireless station.

3. The method of claim 1, wherein the detecting includes receiving a beacon from the available WiFi network, wherein the beacon includes a Basic Service Set Identifier (BSSID) and wherein the method further includes:
comparing the BSSID to stored BSSIDs for known WiFi networks to determine the credential information for the available WiFi network.

4. The method of claim 1, wherein the detecting of the available WiFi network is performed by a WiFi chip of the wireless station.

5. The method of claim 2, wherein the credential information includes at least one of a user identification or a password.

6. The method of claim 1, further comprising:
generating a relationship database including the relationships between cell identities and WiFi networks.

7. The method of claim 1, further comprising:
receiving, from a remote source, a relationship database including relationships between cell identities and WiFi networks.

8. The method of claim 1, wherein the first type of scan is performed across 35 supported channels in 2.4 GHz and 5 GHz operating ranges and every 45 seconds and the second type of scan is performed across channels 1, 6, and 11 in the 2.4 GHz and 5 GHz operating ranges and every 135 seconds.

9. A station, comprising:
a memory arrangement that stores identities of known WiFi networks and relationships between the known WiFi networks and cells of cellular networks;
a cellular chip configured to identify cells of cellular networks that are available for communication with the station;
a WiFi chip configured to scan for WiFi networks that are available for communication with the station, wherein the WiFi chip performs a first type of scan for available WiFi networks when the cellular chip identifies available cells that have relationships with known WiFi networks and performs a second type of scan for available WiFi networks when the cellular chip identifies available cells that have no relationships with known WiFi networks, wherein the first type of scan is performed at least one of more frequently or over more channels compared to the second type of scan;
a processor configured to perform an association procedure to associate with an available WiFi network when the scans of the WiFi chip identify an available WiFi network, wherein when the processor is in a sleep state, the WiFi chip is configured to wake the processor to perform the association procedure when the WiFi chip identifies an available WiFi network.

10. The station of claim 9, wherein the memory arrangement further stores credential information for the known WiFi networks and the association procedure is performed using the stored credential information without interaction from a user of the station.

11. The station of claim 9, further comprising:
a Universal Asynchronous Receiver/Transmitter (UART) that communicates the cells that are available from the cellular chip to the WiFi chip.

12. The station of claim 9, wherein the processor stores the identities of the known WiFi networks and relationships between the known WiFi networks and cells in the memory arrangement by determining a WiFi network to which the station is currently connected, receiving an identification of all cells that are available to the station when the wireless station is connected to the WiFi network and storing the relationships between the WiFi network to which the station is currently connected and all the cells that are available to the station.

13. A method comprising:
at a wireless station:
determining a cell identity of a cell of a cellular network to which the wireless station is currently connected;
determining whether the cell identity is related to a WiFi network based on a comparison to relationships between cell identities and WiFi networks stored in the wireless station;
performing a first type of scan for available WiFi networks when the cell identity is related to the WiFi network; and
performing a second type of scan for available WiFi networks when the cell identity is not related to the WiFi network, wherein the first type of scan is performed at least one of more frequently or over more channels compared to the second type of scan;
detecting an available WiFi network when performing one of the first and second scans;
automatically connecting to the detected available WiFi network; wherein a processor of the wireless station is in a sleep state and when the WiFi network is detected, the processor is placed in an awake state to perform a portion of the automatically connecting.

14. The method of claim 13, wherein the automatically connecting includes providing, for the available WiFi network, credential information that is stored at the wireless station.

15. The method of claim 13, wherein the detecting includes receiving a beacon from the available WiFi network, wherein the beacon includes a Basic Service Set Identifier (BSSID) and wherein the method further includes:
comparing the BSSID to stored BSSIDs for known WiFi networks to determine the credential information for the WiFi network.

16. The method of claim 13, wherein the detecting of the available WiFi network is performed by a WiFi chip of the wireless station.

17. The method of claim 14, wherein the credential information includes at least one of a user identification or a password.

18. The method of claim 13, further comprising generating a relationship database including the relationships between cell identities and WiFi networks.

19. The method of claim 13, further comprising receiving, from a remote source, a relationship database including relationships between cell identities and WiFi networks.

20. The method of claim 13, wherein the first type of scan is performed across 35 supported channels in 2.4 GHz and 5 GHz operating ranges and every 45 seconds and the second type of scan is performed across channels 1, 6, and 11 in the 2.4 GHz and 5 GHz operating ranges and every 135 seconds.

\* \* \* \* \*